Patented June 13, 1933

1,913,938

UNITED STATES PATENT OFFICE

FLOYD J. METZGER, OF NEW YORK, N. Y., AND WENDELL G. FOGG, OF ELIZABETH, NEW JERSEY, ASSIGNORS TO AIR REDUCTION COMPANY, INCORPORATED, OF NEW YORK, N. Y., A CORPORATION OF NEW YORK

CATALYTIC MATERIAL AND METHOD OF PRODUCING SAME

No Drawing.  Application filed June 11, 1929. Serial No. 370,155.

This invention relates to a catalytic material adapted more particularly to facilitate the dehydration decomposition of organic substances and especially the dehydration of alcoholic bodies and a method of producing such material.

It has been known heretofore that pure alumina is effective as a dehydration catalyst. Commercial alumina, however, includes impurities such as certain compounds of iron, silica, alkalis, etc., which even though present in extremely minute quantities affect the efficiency and life of the catalyst. Such material cannot be used successfully as a dehydration catalyst. Moreover, the purification of commercial alumina by the ordinary procedure to secure pure alumina which is adapted for use as a catalyst involves a prohibitive expense. Consequently, alumina has not been utilized heretofore as a dehydration catalyst in commercial operations.

It is the object of the present invention to provide an improved alumina catalyst for dehydration and equivalent operations and a method of treating commercial alumina which is inexpensive and effective to produce such a catalyst.

We have discovered that commercial alumina which is otherwise in suitable condition for use as a catalyst may be activated or otherwise modified by a simple treatment with certain acids. The impurities in the alumina, which act as poisons or otherwise prevent the effective use of alumina as a catalyst, are modified, converted, or removed by the treatment, so that they no longer interfere with the catalytic activity of the alumina. Consequently alumina treated in the manner hereinafter described may be employed effectively as a catalytic material, and since the cost of the treatment is relatively slight, the alumina is available as a catalyst in large scale commercial operations.

For use as a catalytic material, commercial alumina in granular, porous form is utilized preferably in sizes from ¼ to ½" mesh. The alumina should be dehydrated initially at a temperature not in excess of a dull red heat. Such material has the physical properties necessary to adapt it for catalysts in the vapor phase.

We have discovered that by treating the dehydrated commercial alumina with dilute acid and subsequently washing the material, an active catalytic material may be obtained. The acids available for the treatment include among others hydrochloric, nitric, sulphuric, and phosphoric acids. The commercial alumina may be treated with any of these acids by simply placing it in a 15 to 50% solution thereof, or by pouring such a solution over the alumina. Stronger or weaker acids may be employed. The alumina is allowed to stand in the acid for several hours, preferably 10 to 15. The acid is then drained off, and the alumina is washed with water. It may then be dried for convenience in storage or shipment. Drying is, however, not essential, because the moist material may be transferred directly to the catalytic chamber without drying.

Treatment with sulphuric acid produces an active catalytic material capable of producing a good yield in the catalytic operation. It is possible, however, that gaseous sulphur compounds may be produced in small quantity when alumina previously treated with sulphuric acid is utilized in a catalytic operation. While this may not be objectionable in some operations, we have found that a more satisfactory acid is dilute phosphoric acid which we prefer to employ in preparing the catalytic material.

As an example of the invention, we place 200 pounds of commercial alumina in sizes from ¼ to ½" mesh in a stoneware vessel. To this we add 81½ pounds of 85% phosphoric acid previously diluted with 22 gallons of distilled water. The dilute phosphoric acid is sufficient to completely cover the alumina. The alumina is allowed to stand over night in the acid, which is then drawn off. The mass is washed with 40 gallons of distilled water, a part of which is left for one hour before being removed. The washing is repeated four times. After the final washing, the material may be dried for convenience in shipment.

Analysis of the material so treated and dried at 110° C. showed the following composition:

| | Percent |
|---|---|
| Loss on ignition | 6.1 |
| $SiO_2$ | 0.4 |
| $Na_2O$ | 0.6 |
| $Fe_2O_3$ | 4.4 |
| $P_2O_5$ | 13.6 |
| $Al_2O_3$ | 74.2 |

The material is not pure alumina and is not freed entirely from impurities initially present in the commercial alumina. It is a novel material having improved catalytic properties more particularly for the dehydration decomposition of organic compounds such as the alcohols.

The catalyst may be employed, for example, for the dehydration of ethanol to produce ethylene. It functions best at a temperature of 325 to 450° C. It is maintained at such a temperature in a suitable catalytic chamber, and ethanol, for example, is caused to pass through the chamber and to contact with the catalyst. It is possible thus to produce ethylene of a minimum purity of 99% in large quantities over a period of months of operation.

After the catalyst has been in operation for a period of 2 to 4 weeks, the activity becomes somewhat impaired, as the result, apparently, of the deposition of carbon therein. It may, however, be completely revivified without removing it from the catalytic chamber by passing a current of air through the catalytic material at a temperature of about 325 to 400° C., that is to say, a temperature comparable with that at which the catalytic reaction is conducted. The air is passed through the catalytic material at about the same rate of speed as the vapors in normal operation. Revivification requires from 12 to 18 hours under normal circumstances. The catalytic material may be revivified thus repeatedly, its initial qualities as a catalyst being restored completely at the end of each cycle. Other oxidizing gases may, of course, be substituted for air in the revivification as described.

The improved quality of the catalyst material is evident in view of the results obtainable therewith as hereinbefore described, and in comparison with commercial alumina. An attempt was made to use commercial alumina for the dehydration of ethanol: a very poor product was obtained. The ethylene content of the gases did not exceed 70 to 80%, and the yield or conversion of alcohol was very low. Moreover, the life or continued activity of commercial alumina as a catalyst is very short, and commercial alumina cannot be employed, therefore, as a catalyst. Catalytic material prepared from commercial alumina in the manner hereinbefore described is, on the other hand, highly active, produces a good yield, and ensures a high minimum purity of the resulting product. It has, moreover, a relatively long life and can be restored readily to its initial condition when its activity is impaired.

In utilizing a catalyst as described, it is necessary to employ a suitable catalytic chamber. The use of iron is objectionable and is even prohibited for some operations. Silica or siliceous materials are likewise unsuitable. We have discovered that by constructing the essential parts of a catalytic chamber of aluminum or of calorized iron all of the difficulties are obviated. We prefer, therefore, for practical and economical reasons, to carry out the catalytic operations in chambers constructed of calorized iron. Such chambers may be utilized advantageously in catalytic reactions where phosphoric acid absorbed in coke or other porous material is used. Such a chamber or furnace has a long life and does not reduce the activity of the catalyst.

Various changes may be made in the composition and procedure as described and in the method of utilizing the catalytic material, without departing from the invention or sacrificing any of the advantages thereof.

We claim:

1. A catalyst consisting of alumina containing some of the impurities initially present in commercial alumina but from which material soluble in dilute mineral acids have been removed.

2. A catalyst consisting of commercial alumina activated by treatment with a mineral acid.

3. A catalyst consisting of commercial alumina activated by treatment with phosphoric acid.

4. A catalyst containing principally alumina activated by treatment with a mineral acid, and phosphates.

5. The method of preparing a catalyst which comprises removing catalyst poisons from commercial alumina by treating it with a mineral acid without substantial reaction with the aluminum oxide content thereof.

6. The method of preparing a catalyst which comprises removing catalyst poisons from commercial alumina by treating the alumina with a dilute mineral acid and thereafter washing the material.

7. The method of preparing a catalyst which comprises allowing commercial alumina to remain in contact with a mineral acid for a period of time without substantial reaction between the aluminum oxide content thereof and the acid and thereafter washing the material.

8. The method of preparing a catalyst which comprises allowing commercial alumina to remain in contact with phosphoric acid for a period of time without substantial reaction between the aluminum oxide content thereof and the acid and thereafter washing the material.

9. The method of preparing a catalyst which comprises drying commercial alumina, allowing it to remain in contact with a mineral acid without substantial reaction between the aluminum oxide content thereof and the acid and thereafter washing the material.

10. The method of revivifying an alumina catalyst which comprises subjecting it to a current of air or other oxidizing gas at a temperature substantially that at which the catalytic reaction is conducted.

11. The method of preparing ethylene which comprises passing the vapor of ethanol over a catalyst consisting of alumina containing impurities normally present in commercial alumina but freed from materials soluble in dilute mineral acids.

12. The method of preparing ethylene which comprises passing the vapor of ethanol over a catalyst consisting of commercial alumina activated by treatment with a mineral acid.

13. The method of preparing ethylene which comprises passing the vapor of ethanol over a catalyst consisting of commercial alumina activated by treatment with phosphoric acid.

14. The method of preparing ethylene which comprises passing the vapor of ethanol over a catalyst consisting of commercial alumina activated by treatment with a mineral acid, and phosphates.

In testimony whereof we affix our signatures.

FLOYD J. METZGER.
WENDELL G. FOGG.